United States Patent
Ohta et al.

(10) Patent No.: US 6,437,817 B1
(45) Date of Patent: *Aug. 20, 2002

(54) IMAGE FORMING APPARATUS AND IMAGE FORMING METHOD

(75) Inventors: Mitsuhiro Ohta, Susono; Jiro Ishizuka, Numazu, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,174

(22) Filed: Jan. 28, 1999

(30) Foreign Application Priority Data

Jan. 30, 1998 (JP) .......................... 10-019717

(51) Int. Cl.⁷ ................................. B41J 2/47
(52) U.S. Cl. ...................... 347/254; 347/131
(58) Field of Search ............... 347/254, 251, 347/252, 253, 240, 188, 112, 114, 128, 141, 142, 151, 153, 162; 355/326 R; 358/456

(56) References Cited

U.S. PATENT DOCUMENTS

| | | | | |
|---|---|---|---|---|
| 4,617,580 A | | 10/1986 | Miyakawa | .................. 347/105 |
| 4,754,294 A | * | 6/1988 | Kato | .......................... 346/105 |
| 4,989,098 A | * | 1/1991 | Arimoto | ..................... 358/455 |
| 5,550,626 A | * | 8/1996 | Kobayshi et al. | ....... 355/326 R |
| 5,633,670 A | * | 5/1997 | Kwak | .......................... 347/188 |
| 5,731,884 A | * | 3/1998 | Inoue | ......................... 358/456 |
| 5,937,087 A | | 8/1999 | Sasanuma et al. | .......... 382/167 |

FOREIGN PATENT DOCUMENTS

| EP | 0 660 589 | 6/1995 |
|---|---|---|
| EP | 0 743 785 | 11/1996 |
| JP | 60-230765 | 11/1985 |

* cited by examiner

Primary Examiner—Lamson D. Nguyen
(74) Attorney, Agent, or Firm—Fitzpatrick, Cella, Harper & Scinto

(57) ABSTRACT

Image forming apparatus and method for identifying the type of transfer material and controlling irradiation of a laser beam for latent image formation based on the identified type of transfer material. A latent image is formed by modulating a pulse number, pulsewidth, or amplitude of an outputted laser beam to achieve scan-line density of 250 Lines/inch or more. By this, it is possible to suppress occurrence of an optical interference caused by the optical system and prevent image quality deterioration due to the optical interference.

28 Claims, 11 Drawing Sheets

FIG. 1
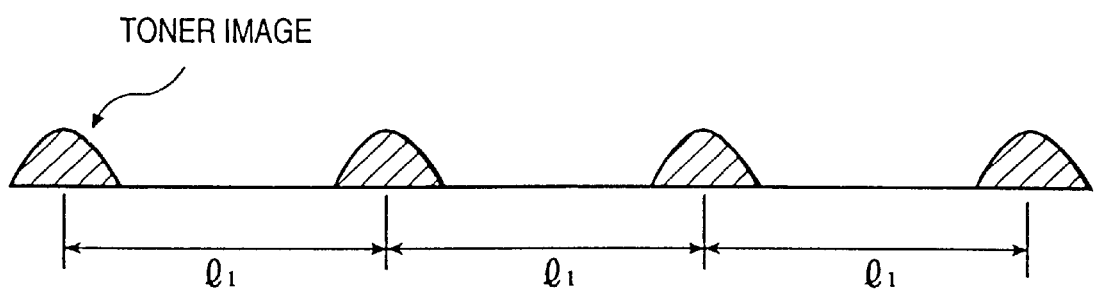
TONER IMAGE
↓ INCREASE THE NUMBER OF LINES
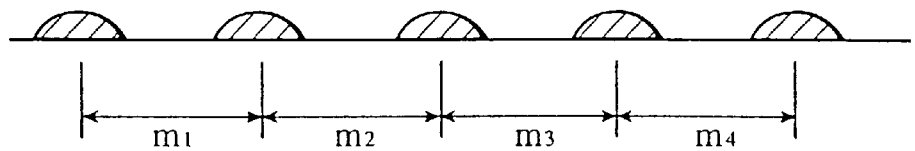
LINE SPACES BECOME VARIANT

FIG. 3A DENSITY DISTRIBUTION OF ORIGINAL IMAGE
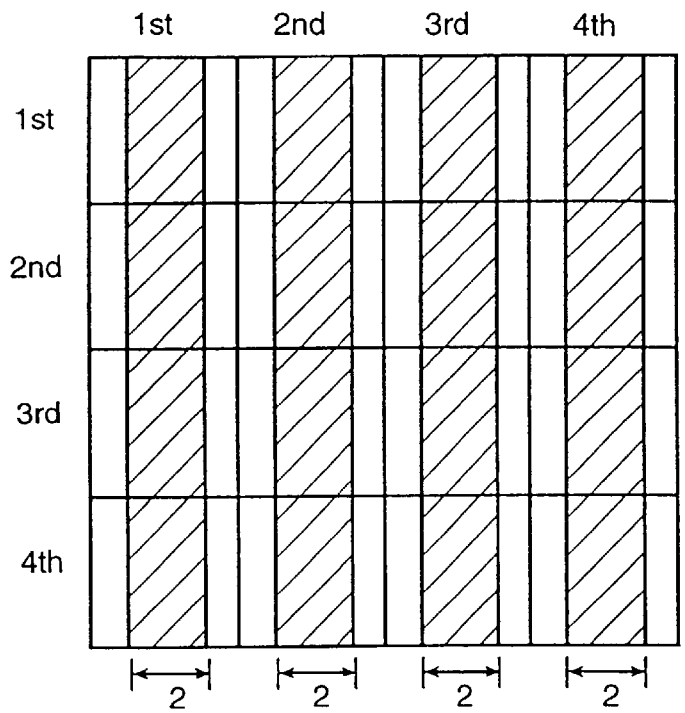
FIG. 3B DENSITY DISTRIBUTION AFTER ERROR DIFFUSION PROCESS
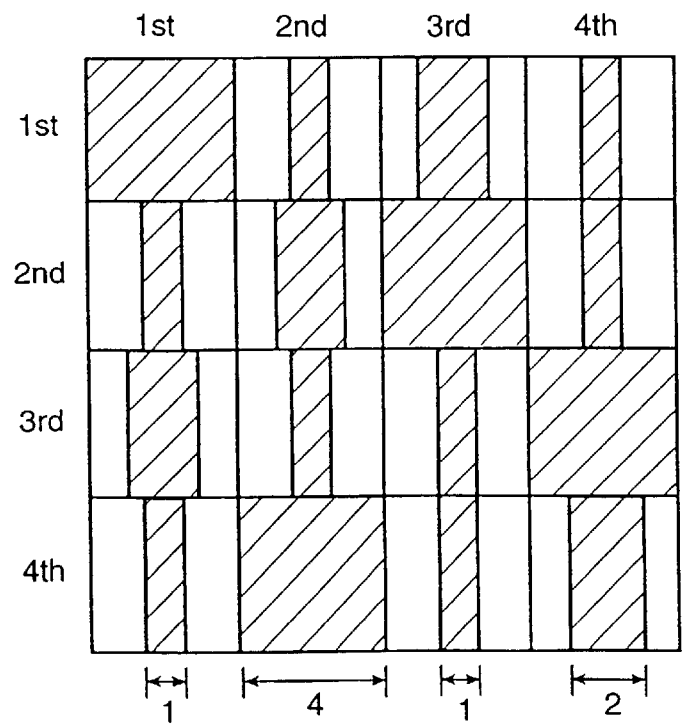

IMAGE FORMING APPARATUS AND IMAGE FORMING METHOD

BACKGROUND OF THE INVENTION

The present invention relates to an image forming apparatus and an image forming method using a transparent laminated film on which a color toner image is formed by an electrophotographic printing method or an electrostatic printing method. More particularly, the present invention relates to an image forming apparatus and an image forming method for forming a color image on a transparent laminated film which is to be placed on an overhead projector (OHP).

FIG. 5 is a cross-section of an electrophotographic printing apparatus, capable of forming a full-color image. In FIG. 5, the electrophotographic printing apparatus comprises a transfer material conveyance system located from one side to the substantial center of the apparatus main body 100, a latent image forming unit provided adjacent to a transfer drum 8 which is a part of the transfer material conveyance system, and a rotation-type developing unit serving as developing means, located adjacent to the latent image forming unit. The aforementioned transfer material conveyance system comprises: transfer material feeding trays 101 and 102 which are detachably inserted to openings provided on one side (right side in FIG. 5) of the apparatus main body 100; transfer material feeding rollers 103 and 104 provided substantially directly above the trays 101 and 102; feeding guides 4A and 104b comprising feeding rollers 106, which are located adjacent to the feeding rollers 103 and 104; a transfer drum 8 rotatable in the direction of an arrow in FIG. 5; a conveyance belt 15 provided adjacent to a separation claw 14; and a fixer 16 which is provided near the end of the conveyance belt 15 in the conveyance direction, and is provided adjacent to a discharge tray 17 which extends from the apparatus main body 100 and is detachable from the apparatus main body 100. The transfer drum 8 is located adjacent to the feeding guide 104b. Near the periphery of the transfer drum 8, an abutting roller 7, a gripper 6, a transfer-material separation charger 12, and a separation claw 14 are provided in the upstream-to-downstream direction of the rotation of the transfer drum 8. In the interior periphery of the transfer drum 8, a transfer charger 9 and a transfer-material separation charger 13 are provided.

The latent image forming unit comprises: the photosensitive drum 2 serving as an image transfer body, whose outer periphery abuts against the outer periphery of the aforementioned transfer drum 8, and is rotatable in the direction of an arrow in FIG. 5; image exposure means, such as a laser-beam scanner, for forming an electrostatic latent image on the periphery of the photosensitive drum 2; and image exposure reflection means such as a polygon mirror. Near the periphery of the photosensitive drum 2, an electrostatic charger for discharge (hereinafter referred to as discharger) 10, cleaning means 11, and a primary electrostatic charger 3 are provided in the upstream-to-downstream direction of the rotation of the photosensitive drum 2.

The rotation-type developing unit comprises: a rotational body 4a; and an yellow developer 4Y, a magenta developer 4M, a cyan developer 4C and a black developer 4BK which are incorporated in the rotational body 4a and enable to visualize the electrostatic latent image formed on the periphery of the photosensitive drum 2 at a position facing the periphery of the photosensitive drum 2.

An image forming sequence of the image forming apparatus having the above-described construction is briefly described, taking a full-color mode as an example. When the photosensitive drum 2 is rotated in the direction of the arrow in FIG. 5, a photosensitive material on the photosensitive drum 2 is uniformly charged by the primary electrostatic charger 3, then image exposure is performed by a laser beam E which is modulated by yellow image signals of an original image (not shown). By this, an electrostatic latent image is formed on the photosensitive drum 2, and the electrostatic latent image is developed by the yellow developer 4Y which is positioned at a predetermined developing positions by rotation of the rotational body 4a.

Meanwhile, a transfer material conveyed through the feeding guide 4A, feeding rollers 106, and feeding guide 104b, is gripped by the gripper 6 in a predetermined timing, and is electrostatically wrapped around the transfer drum 8 by the abutting roller 7 and electrodes facing the abutting roller 7. While the transfer drum 8 rotates in the direction of an arrow in FIG. 5 in synchronization with the photosensitive drum 2, the image developed by the yellow developer 4Y is transferred by the transfer charger 9 at the position where the periphery of the photosensitive drum 2 abuts against the periphery of the transfer drum 8. The transfer drum 8 continues its rotation, preparing to transfer the next color (magenta in FIG. 5).

The photosensitive drum 2 is discharged by the discharger 10 and cleaned by the cleaning means 11. Then, the photosensitive drum 2 is charged again by the primary electrostatic charger 3 and the above-described image exposure is performed according to the subsequent magenta image signals. The above-described image exposure is performed on the photosensitive drum 2 according to magenta image signals. The rotation-type developing unit rotates while an electrostatic latent image is formed on the photosensitive drum 2 according to the magenta image signals by the above image exposure. The magenta developer 4M is positioned at a predetermined developing position and a predetermined magenta development is performed. Next, the above-described process is performed with respect to cyan and black and completes the transfer process for four colors. The four-color toner image formed on the transfer material is discharged by the discharger 10 and charger 13. The gripper 6 releases the transfer material, the transfer material is then separated from the transfer drum 8 by the separation claw 14 and is transferred to the fixer 16 by the conveyance belt 15 to be fixed by heat and pressure. As a result, a series of full-color print sequences is completed and the necessary full-color print image is formed. The fixer 16 includes a surface-lubricant coating mechanism which promotes separation of an OHP film from a fixation member. However, it is a recent trend to use less amount of the surface lubricant.

Next, toner used in the electrophotographic apparatus is described.

Toner for a color electrophotographic printing apparatus requires excellent melting and color mixture characteristics when heat is applied. Thus, toner having a sharp-melt characteristic is preferable where the softening point is low and melting time is short.

The use of a sharp-melt toner improves the color reproducible range of an original image, and enables to achieve a colored copy consistent with a multiple-color original image.

The foregoing sharp-melt toner is manufactured by melting and mixing, e.g., polyester resin, styrene-acrylic resin, colorant (dye, sublimation-type dye), charge control agent and the like, then grinding and classifying them. If necessary, a process of adding various external agents to the toner may be added.

For color toner, it is particularly preferable to employ toner utilizing polyester as a binding resin, taking into account fixation and sharp-melt characteristics. The sharp-melt polyester resin is a high molecular compound including ester bonding in the principal chain of a molecule in which diol compound and dicarboxylic acid are synthesized.

Particularly, because of its sharp melting characteristic, it is preferable to use polyester resin, represented by the following formula (1) (R is ethylene or propylene radical; x and y are respectively a positive integer which is 1 or more; and the average value of x+y is 2 to 10), where a bisphenol derivative or its substituent as a diol component, and a carboxylic acid compound (e.g., fumaric acid, maleic acid, maleic anhydride, phthalic acid, terephthalic acid, trimellitic acid, pyromellitic acid or the like) comprising carboxylic acid of bi- (or more) valence or its acid anhydride or its sub-alkyl ester, are at least copolymerized.

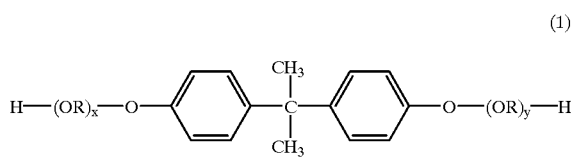
(1)

The softening point of the sharp-melt polyester resin is 60° C. to 150° C., preferably 80° C. to 120° C. The softening characteristic of toner, having the above-described sharp-melt polyester resin as binding resin, is shown in FIG. 6.

Herein, a Flow-Tester CFT 500 (manufactured by Shimadzu Corporation) is used for the purpose of an experiment. Assume that a die (nozzle) has a diameter of 0.5 mm and a thickness of 1.0 mm, and an extrusion load of 50 kg is added to the toner. At the initial setting temperature of 80° C., the toner is preheated for 300 seconds. Then, the temperature is uniformly raised at the rate of 5° C./minute. The curve representing the amount of plunger fall and the temperature is obtained (hereinafter referred to as a softening curve S). The sample toner used is fine powder precisely measured to 1 g–3 g. The cross section of the plunger is 10 cm$^2$.

FIG. 6 shows the curve obtained as the softening curve S. Along with the uniform temperature rise, toner is gradually heated and eventually begins to flow out (plunger descent A→B). As the temperature increases further, the melted toner flows out in a greater amount (B→C→D). Finally, the plunger stops falling and the toner flow stops (D→E).

The height H of the softening curve S indicates the amount of the entire flow. The temperature $T_0$ for H/2, corresponding to the point C, indicates the softening point of the toner.

The above measurement method can be similarly applied to measuring a heat melting characteristic of resin for forming binding resin or a second transparent resin layer.

The sharp-melt toner or resin satisfies the following condition:

$$T_1 = 90° C. \text{ to } 150° C., |\Delta T| = |T_1 - T_2| = 5° C. \text{ to } 30° C.$$

where $T_1$ indicates the temperature when the melt viscosity is 105 cp, and $T_2$ indicates the temperature when the viscosity is 5×104 cp.

The sharp-melt toner or resin, having the above-described temperature versus melting viscosity characteristics, is characterized by extremely sharp viscosity decrease caused by heating. Such decrease in viscosity enables appropriate mixing between the top toner layer and the bottom toner layer, and enables rapid enhancement in transparency in the toner layers, resulting in excellent subtractive mixture.

Lately, less use of the surface lubricant is the trend for improving the quality of a projected image of an OHP film.

However, in the above-described conventional example, since the projection image quality has been improved to brighter and more vivid colors, the deterioration in image quality caused by optical interference between the optical portion of the projector and an OHP image become more conspicuous.

The deterioration in image quality is now described with reference to FIG. 4. FIG. 4 is an explanatory view showing a mechanism of occurrence of interference stripes. In a case where toner images formed as a binary image are periodically arrayed on the OHP film, the OHP film acts as a diffraction grating. In addition, a Fresnel lens of the projector also acts as a diffraction grating. Therefore, because of the film and the lens arrangement, scattered light from the two gratings interfere with each other, generating difference in light intensity. The difference in intensity of light causes light-and-dark stripes in a projected image. The object of the present invention is to achieve an image forming apparatus which eliminates such light-and-dark stripes in a projected image of an OHP film. The present invention has a further object to provide an image forming apparatus and method having the new functions.

SUMMARY OF THE INVENTION

In order to achieve the above objects, the image forming apparatus and image forming method according to the present invention achieves a projected image of better quality where a formed image does not act as a diffraction grating and where optical interference does not occur between an optical system of a projector and the formed image in a case where a light-transmitting transparent film is selected as a printing material.

More specifically, an image forming apparatus according to the present invention is characterized by comprising: conveyance means for conveying a transfer material; transfer material identifying means for identifying a type of transfer material conveyed by the conveyance means; scan-line density changing means for changing scan-line density of a laser beam based on an identified result; pulse number modulation control means for modulating an output pulse number of the laser beam based on the changed scan-line density; latent image forming means for forming a latent image at the changed scan-line density, in accordance with the type of transfer material; and developing means for developing the formed latent image.

Furthermore, an image forming apparatus according to the present invention is characterized by comprising: conveyance means for conveying a transfer material; transfer material identifying means for identifying a type of transfer material conveyed by the conveyance means; amplitude modulation control means for modulating an output pulse amplitude of a laser beam for latent image formation, in accordance with an identified result; latent image forming means for forming a latent image charged at multivalue levels based on irradiation of the laser beam where amplitude is modulated; and developing means for developing the formed latent image.

Furthermore, an image forming apparatus according to the present invention is characterized by comprising: conveyance means for conveying a transfer material; transfer material identifying means for identifying a type of transfer material conveyed by the conveyance means; threshold value calculating means for calculating a threshold value for density data conversion in accordance with an identified result; density level converting means for forming a converted image where density of an original image has been converted by comparing the density of the original image with the calculated threshold value; pulsewidth modulation control means for modulating an output pulsewidth of a laser beam in accordance with the converted density data; latent image forming means for forming a latent image based on irradiation of the laser beam where pulsewidth is modulated; and developing means for developing the formed latent image.

Moreover, an image forming method according to the present invention is characterized by comprising the steps of: a conveyance step of conveying a transfer material; a transfer material identifying step of identifying a type of transfer material conveyed in the conveyance step; a scan-line density changing step of changing scan-line density of a laser beam based on an identified result; a pulse number modulation control step of modulating an output pulse number of the laser beam based on the changed scan-line density; a latent image forming step of forming a latent image at the changed scan-line density, in accordance with the type of transfer material; and a developing step of developing the formed latent image.

Furthermore, an image forming method according to the present invention is characterized by comprising the steps of: a conveyance step of conveying a transfer material; a transfer material identifying step of identifying a type of transfer material conveyed in the conveyance step; an amplitude modulation control step of modulating an output pulse amplitude of a laser beam for latent image formation, in accordance with an identified result; a latent image forming step of forming a latent image charged at multivalue levels based on irradiation of the laser beam where amplitude is modulated; and a developing step of developing the formed latent image.

Furthermore, an image forming method according to the present invention is characterized by comprising the steps of: a conveyance step of conveying a transfer material; a transfer material identifying step of identifying a type of transfer material conveyed in the conveyance step; a threshold value calculating step of calculating a threshold value for density data conversion in accordance with an identified result; a density level converting step of forming a converted image where density of an original image has been converted by comparing the density of the original image with the calculated threshold value; a pulsewidth modulation control step of modulating an output pulsewidth of a laser beam in accordance with the converted density data; a latent image forming step of forming a latent image based on irradiation of the laser beam where pulsewidth is modulated; and a developing step of developing the formed latent image.

Moreover, an image forming apparatus according to the present invention is characterized by comprising: identifying means for identifying a type of print medium; and control means for controlling printing operation for forming an image on the print medium in accordance with an identified result of the identifying means.

Furthermore, an image forming method according to the present invention is characterized by comprising the steps of: an identifying step of identifying a type of print medium; and a control step of controlling printing operation for forming an image on the print medium in accordance with an identified result in the identifying step.

According to an aspect of the image forming apparatus of the present invention, the scan-line density is 250 Lines/inch or more in a case of using a transparent film as the transfer material.

According to an aspect of the image forming method of the present invention, the scan-line density is 250 Lines/inch or more in a case of using a transparent film as the transfer material.

According to an aspect of the image forming apparatus of the present invention, the identifying means determines whether the print medium is an OHP film or a regular sheet of paper.

According to an aspect of the image forming apparatus of the present invention, the controlling of printing is to control scan-line density at the time of image formation.

According to an aspect of the image forming apparatus of the present invention, the control means controls an output pulse of a laser beam at the time of image formation.

According to an aspect of the image forming apparatus of the present invention, in a case where the identifying means determines that the print medium is an OHP film, the control means performs image formation at print density such that the OHP film does not act as a diffraction grating due to a formed image.

According to an aspect of the image forming apparatus of the present invention, the print density where the OHP film does not act as a diffraction grating is 250 Lines/inch or more.

According to an aspect of the image forming apparatus of the present invention, the control means controls a thickness of development toner at the time of image formation.

According to an aspect of the image forming apparatus of the present invention, the control means quantizes a density level of an original image at the time of image formation.

According to an aspect of the image forming method of the present invention, whether the print medium is an OHP film or a regular sheet of paper is determined in the identifying step.

According to an aspect of the image forming method of the present invention, the controlling of printing is to control scan-line density at the time of image formation.

According to an aspect of the image forming method of the present invention, an output pulse of a laser beam at the time of image formation is controlled in the control step.

According to an aspect of the image forming method of the present invention, in a case where it is determined that the print medium is an OHP film in the identifying step, image formation is performed in the control step at print density such that the OHP film does not act as a diffraction grating due to a formed image.

According to an aspect of the image forming method of the present invention, the print density where the OHP film does not act as a diffraction grating is 250 Lines/inch or more.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is an explanatory view showing that non-uniformity of line spaces becomes greater when line density is increased;

FIG. 3A is an explanatory view showing an original image density distribution;

FIG. 3B is an explanatory view showing a density distribution after error diffusion is performed;

DETAILED DESCRIPTION OF THE PREFERRED EMBODIMENTS

Preferred embodiments of the present invention will be described in detail in accordance with the accompanying drawings.

[First Embodiment]

Figure 5:
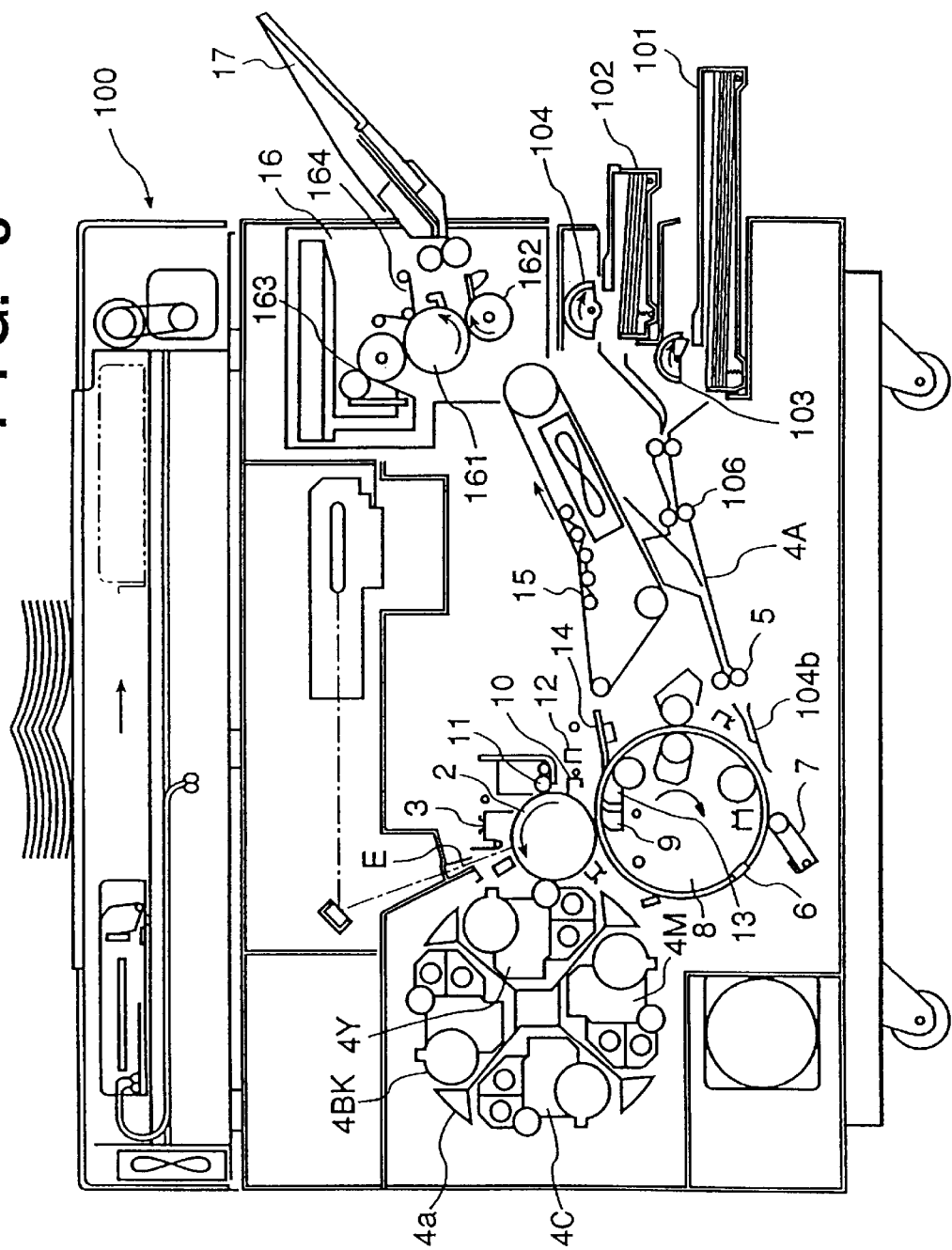
FIG. 5 is a cross section of an image forming apparatus.
Figure 6:
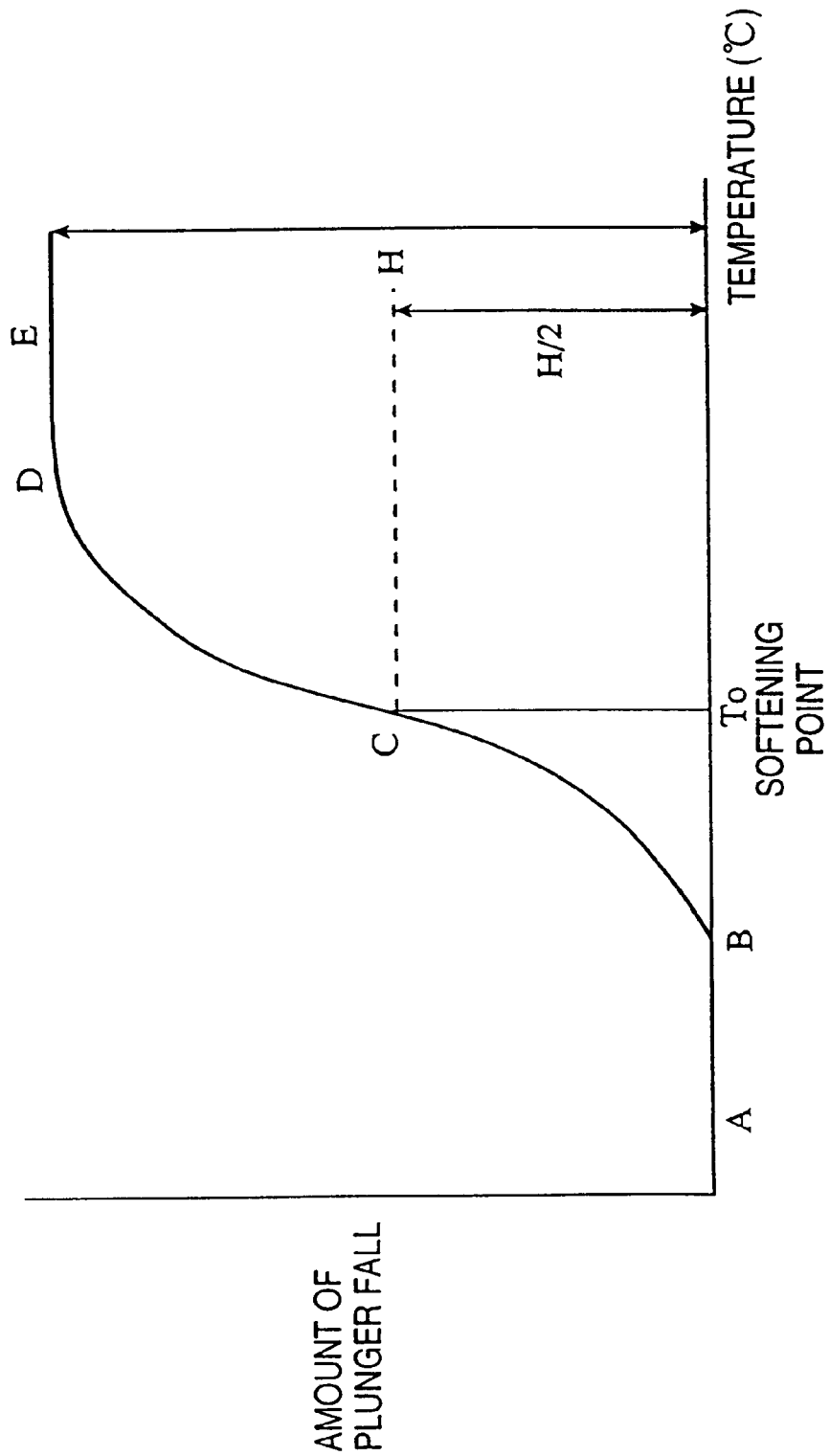
FIG. 6 is a graph showing a melting characteristic of toner.

As shown in FIG. 5, a transparent laminated film or the like is conveyed by conveyance means which conveys a transfer material, and the type of transfer material is identified by transfer material identifying means (not shown) which is provided in the conveyance path. The identifying means determines the type of transfer material based on whether or not a transmission-type sensor has received photoreception signals or whether or not a reflection-type sensor has received reflection light.

Figure 7A:
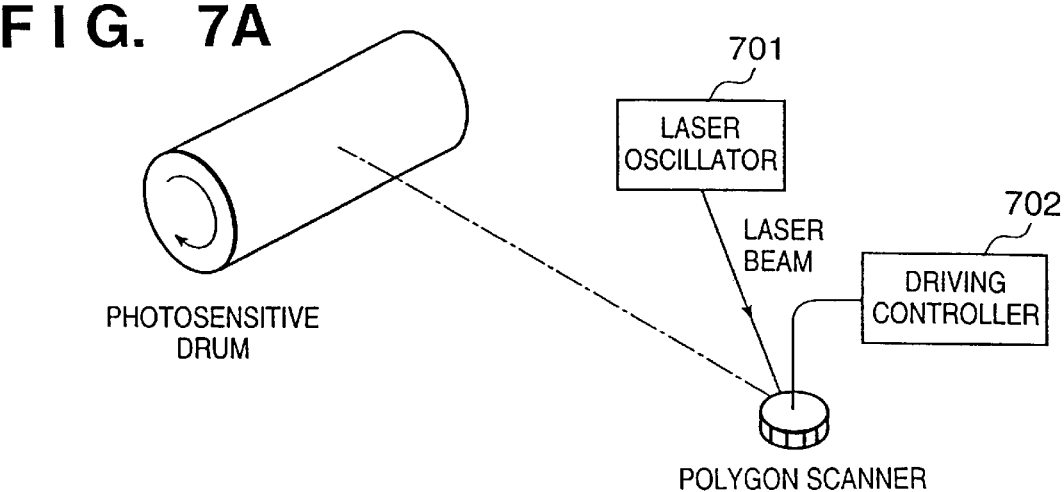
FIGS. 7A to 7C are explanatory views showing a relationship between a laser beam and a photosensitive drum.
Figure 7B:
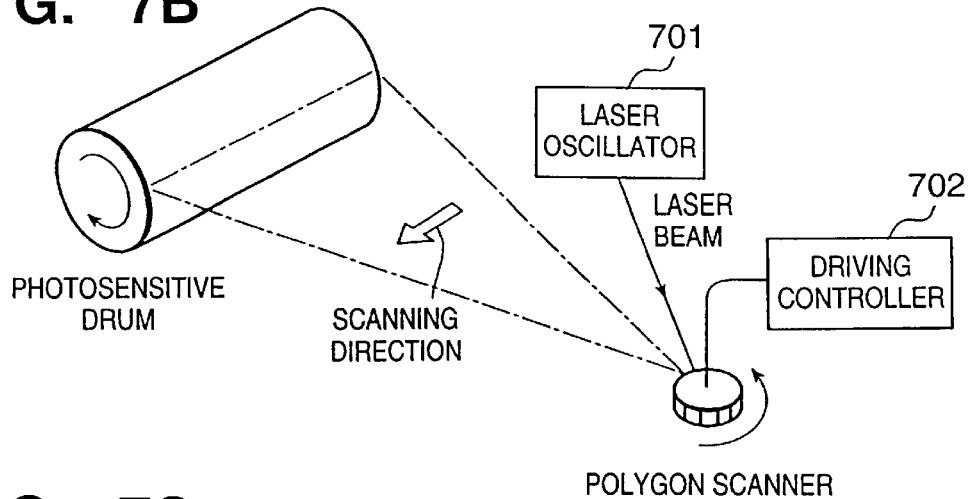
Figure 7C:
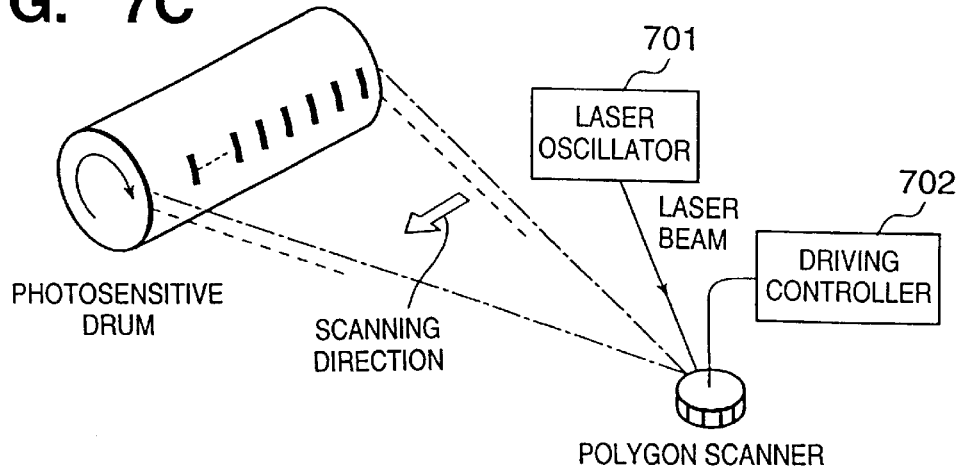

A laser unit irradiates a laser beam E (FIG. 5) on a photosensitive drum 2. The irradiation of the laser beam is turned on/off in accordance with electric signals (video signals) transmitted by a scanner unit, and enables reproduction of light/dark portions of an original image on the photosensitive drum 2. Although not shown, a band-like parallel beam deflected by the polygon scanner unit passes an image forming lens and is focused on a point, having the size equal to one pixel, on the surface of the photosensitive drum. Therefore, if a laser beam is irradiated when the polygon scanner unit and the photosensitive drum are stopped, the laser beam keeps irradiating the point having the same size as one pixel on the photosensitive drum (FIG. 7A). If the polygon scanner unit is rotated while the laser beam is irradiated, a straight line can be drawn from one end to the other end of the photosensitive drum (FIG. 7B). The laser beam shown in FIG. 7B is called horizontal scanning. During the horizontal scanning, if the laser beam is turned on/off, a broken line can be drawn. At the same time, if the photosensitive drum is rotated, the laser beam can be irradiated in the circumferential direction of the photosensitive drum (vertical scanning: FIG. 7C). A laser oscillator 701 and a driving controller 702 are controlled in accordance with the determination result of the identifying means (transmission-type sensor and reflection-type sensor).

Herein, assuming that a scan-line density (print density) is X lines/mm, the polygon scanner unit rotates at the speed such that the X times of horizontal scanning are possible while the surface of the photosensitive drum moves (rotates) for 1 mm. Since the photosensitive drum surface has already been charged by the primary electrostatic charger, the above-described horizontal scanning and vertical scanning neutralize the charge on the portion where the laser beam has been irradiated, and as a result, an electrostatic latent image is obtained on the photosensitive drum.

Figure 4:
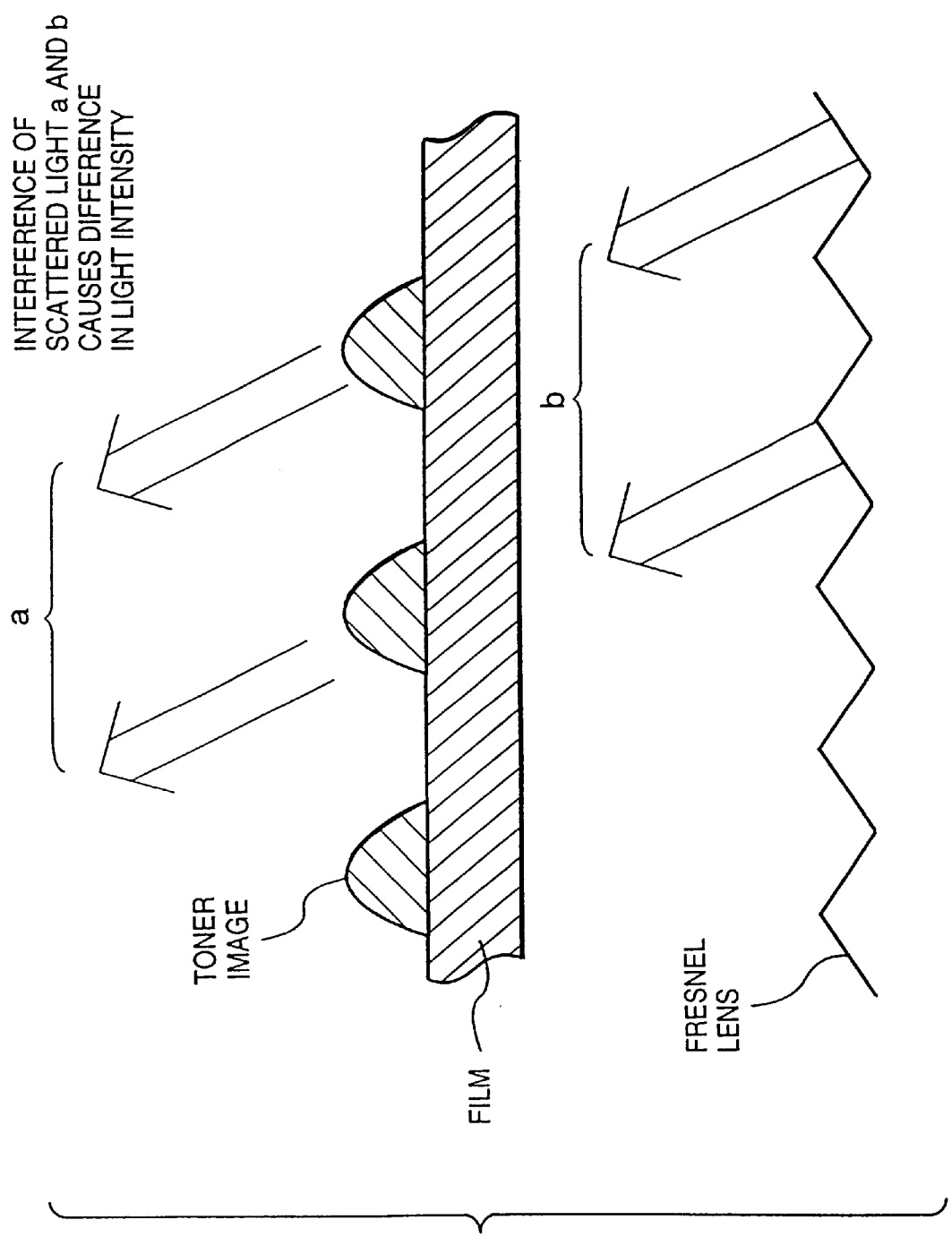
FIG. 4 is an explanatory view showing a mechanism of occurrence of interference stripes.

FIG. 4 shows a cross section of an image, formed at a predetermined scan-line density while rotating the photosensitive drum at a constant speed. FIG. 4 shows a case where lines of toner images as a binary image are arrayed at equal spaces on an OHP film. When the scan-line density is X Lines/mm, the pitch of the toner images is 1/X mm. The toner images arrayed periodically on the OHP film act as a diffraction grating. A Fresnel lens of the projector which projects an OHP film also acts as a diffraction grating. Depending on the arrangement of the OHP film and the lens, light interference occurs due to the two gratings. This light interference causes light-and-dark stripes in a projected image.

However, the spaces between the lines of toner images on the film somewhat vary depending on the image formation precision and toner scattering. If the line density becomes high, the line positions begin to fluctuate or the lines become non-uniform. As a result, the OHP film no longer acts as a diffraction grating (see FIG. 1).

The inventor of the present invention has made comparison of the light-and-dark stripes in a projected image while changing the scan-line density. The toner used was Y (yellow) toner, and HT (half tone), and OHP manufactured by CANON were used. The relation between the scan-line density (Lines/inch) and occurrence of interference stripes is shown in the following table 1.

TABLE 1

| Number of Lines/inch | 200 | 250 | 300 | 350 |
|---|---|---|---|---|
| Occurrence of interference stripes | Occurred | Occurred a little | No Occurrence | No Occurrence |
| Confirmed by eye observation | (×) | (Δ) | (○) | (○) |

×: interference stripes confirmed by eye observation
Δ: slight interference stripes confirmed by eye observation
○: interference stripes not confirmed by eye observation When the scan-line density is higher than 250 Lines/inch, no light-and-dark stripes are generated in the projected image.

Figure 8:
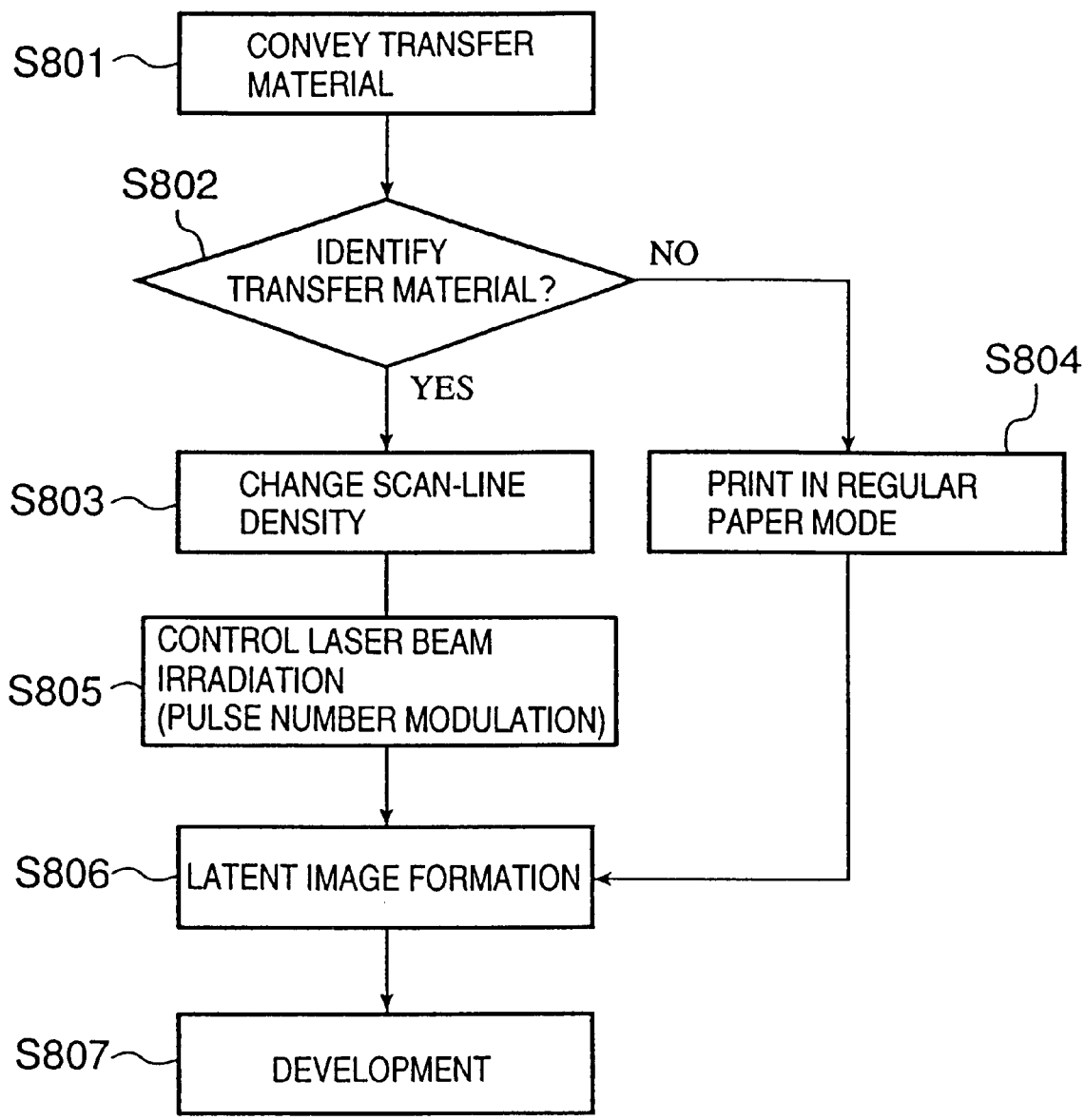
FIG. 8 is a flowchart showing a pulse number modulation process.

Next, a pulse number modulation process is described with reference to FIG. 8. In the transfer material conveyance process (S801), it is determined whether or not a supplied transfer material is a transparent film such as an OHP film or a regular sheet of paper. If it is not an OHP film (S802-NO), printing is performed in a regular paper mode (S804), while if it is an OHP film (S802-YES), the scan-line density changing process is performed (S803). According to the experiment of the inventor, 250 Lines/inch or more is necessary for the scan-line density. In correspondence with the scan-line density changing process, laser irradiation control (pulse modulation) is executed.

Next, a latent image is formed (S806) in the regular paper mode or in the OHP film mode in which the scan-line density has been changed by pulse number modulation. Then, the formed latent image is developed (S807). In the flowchart in FIG. 8, although the scan-line density is set to 250 Lines/ inch or more in the OHP film mode, set separately from the regular paper mode, the OHP film mode and the regular paper mode may be in the same mode.

The laser irradiation control may be executed cooperatively by the laser oscillator and rotation controller of the polygon scanner. Note that taking into consideration of the points in which the interference stripes occur more conspicuously in a bright and vivid image portion, and better tonality is achieved with scan-line density not being increased in a half-tone portion, the scan-line density may be changed by determining a bright and vivid portion (e.g., yellow portion) on an OHP film serving as a transfer material.

[Effect of First Embodiment]

It is determined as to whether or not a transfer material is an OHP film, and in a case of an OHP film, laser beam irradiation is controlled to change the scan-line density to 250 Lines/inch or more, and a latent image is formed. As the precision of image formation is increased, spaces between lines of toner images on the OHP film are more largely affected by toner scattering. Thus, uniform line formation can be prevented. By virtue of this, the OHP film no longer acts as a diffraction grating, and the optical system of the projector and the film no longer interfere with each other on the projected image. Accordingly, the quality of a projected image significantly increases.

[Second Embodiment]

Figure 2:
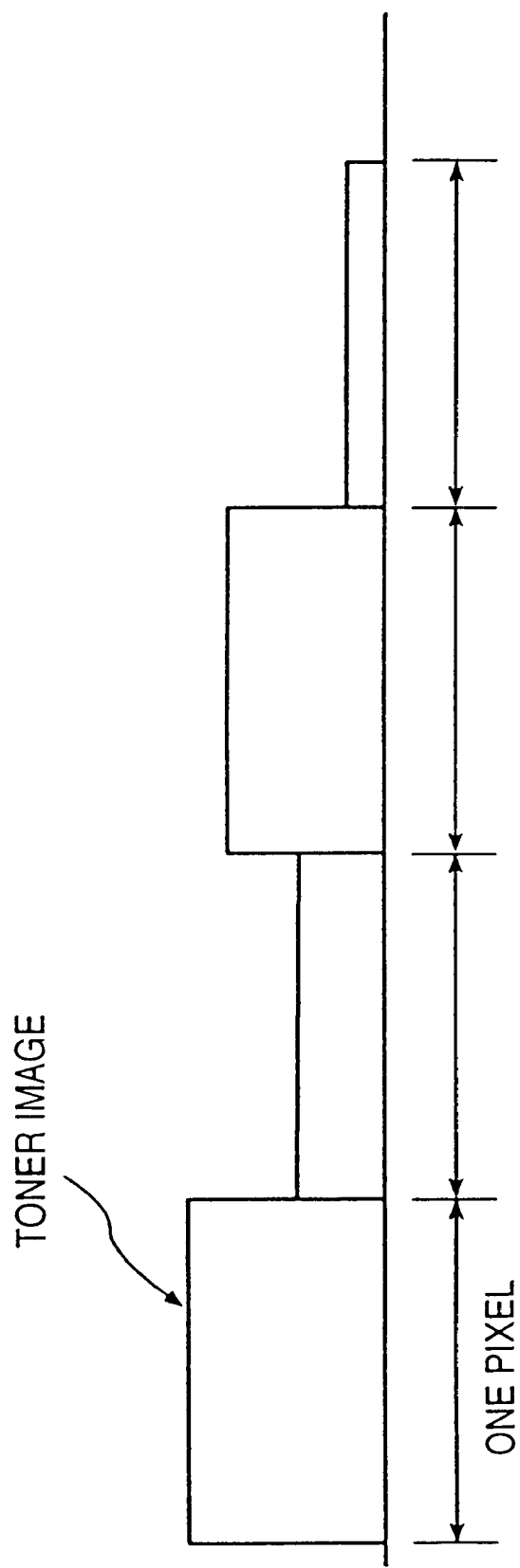
FIG. 2 is an explanatory view for explaining an intensity modulation method for forming a toner image in multivalue levels.

In order not to form a diffraction grating on the transfer material, a latent image may be formed by an intensity modulation method so as to form a toner image in multivalue levels (FIG. 2). By modulating a pulse amplitude, the charging level of the photosensitive drum is controlled in multivalue levels for image formation. In other words, by giving multivalued charging levels to the photosensitive drum, the density is changed in accordance with the thickness of development toner. Since isolated lines cannot be drawn, the film does not interfere with the Fresnel lens of the projector projecting the OHP film.

Figure 9:
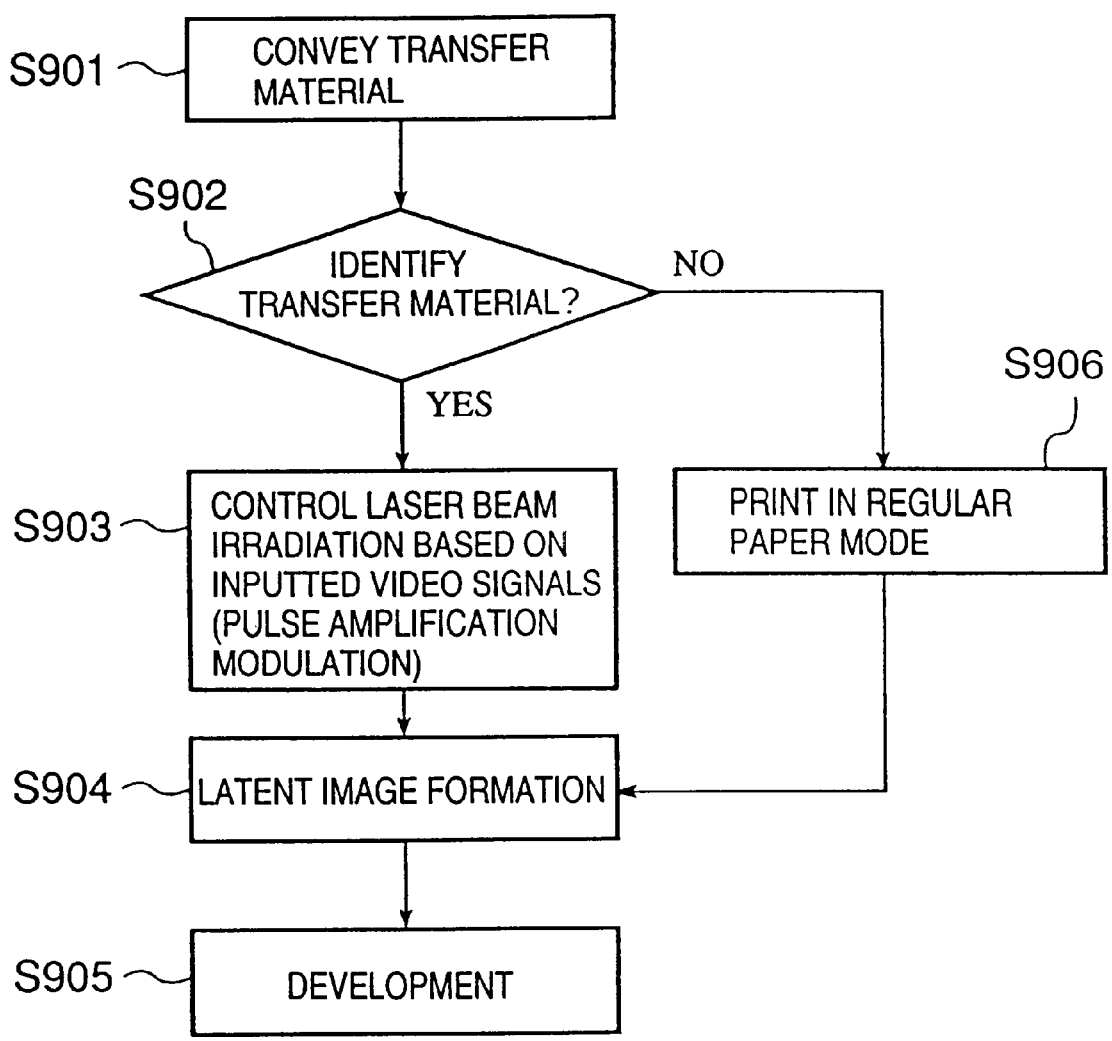
FIG. 9 is a flowchart showing a pulse amplitude modulation process.

Next, the pulse amplitude modulation process is described with reference to FIG. 9. Referring to FIG. 9, it is determined (S901) as to whether or not a supplied transfer material is a transparent film such as an OHP film. If it is not an OHP film (S902-NO), printing is performed in a regular paper mode (S906), while if it is an OHP film, laser irradiation control (pulse amplitude modulation) is executed based on the inputted video signals (S903). By modulating the irradiation intensity in multivalue levels and irradiating the charged photosensitive drum, a latent image is formed in multivalued electrostatic charge levels (S904). Then, the latent image is developed (S905). Accordingly, it is possible to change the density in accordance with the thickness of development toner.

In the flowchart in FIG. 9, although the OHP film mode and the regular paper mode are performed separately, the OHP film mode and the regular paper mode may be in the same mode.

[Effect of Second Embodiment]

It is determined as to whether or not a transfer material is an OHP film, and in a case of an OHP film, the amplitude of laser beam is modulated and irradiation on the photosensitive drum is controlled. By this, a latent image is formed in multivalued electrostatic charge levels. Accordingly, it is possible to change the density in accordance with the thickness of development toner. Since isolated lines cannot be drawn, the optical system of the projector and the film no longer interfere with each other on the projected image. Accordingly, the quality of a projected image significantly increases.

[Third Embodiment]

According to the third embodiment of the present invention, a latent image is formed by utilizing an error diffusion method or a dither method, where density data of an original image is quantized based on a threshold value to convert the density data in pixel units. According to a known method of an error diffusion method, density $f(x, y)$ of an original image is compared with a threshold value $T_n$, obtained by a predetermined rule, and the density level of the pixels is determined based on the comparison result (assume that the obtained density level is $g(x, y)$).

Various methods are known for calculating the threshold value $T_n$. For instance, "A Method of Dynamic Threshold Value" (*Data Processing*, Vol. 17, No. 7, pp 634–640, 1976), or "An Average Error Calculation Method" (*Photo Instrumentation and Remote Sensing*, Vol. 25, No. 2, pp 24–38, 1986) are known.

FIG. 3A shows a density distribution of an original image and FIG. 3B shows a density distribution of an outputted image on which an error diffusion process has been performed. It is assumed in FIG. 3A that the density distribution of the original image is expressed by 4 columns×4 rows pixel data. The density of each pixel (width of the shadowed portion) is uniform for each column (assume that the width of the shadowed portion is 2). The width expresses the density (distribution) of the pixel for the scale of convenience. In other words, the density of the original image can be expressed as $$f(x, y)=2 (x=1 \text{ to } 4, y=1 \text{ to } 4).$$

The density distribution after the error diffusion process can be obtained by comparing $f(x, y)=2$ ($x=1$ to 4, $y=1$ to 4) with the threshold value $T_n$ ($n=1$ to 4) and obtaining a density level of each pixel.

More specifically, the density distribution of four pixels in the fourth row in FIG. 3B is random, i.e., $g(4, 1)=1$, $g(4, 2)=4$, $g(4, 3)=1$, and $g(4, 4)=2$. The sum of the density levels is $\Sigma g(4, j)=8$ ($j=1$ to 4), thus the density level of the original image (2×4=8) is maintained.

Figure 10:
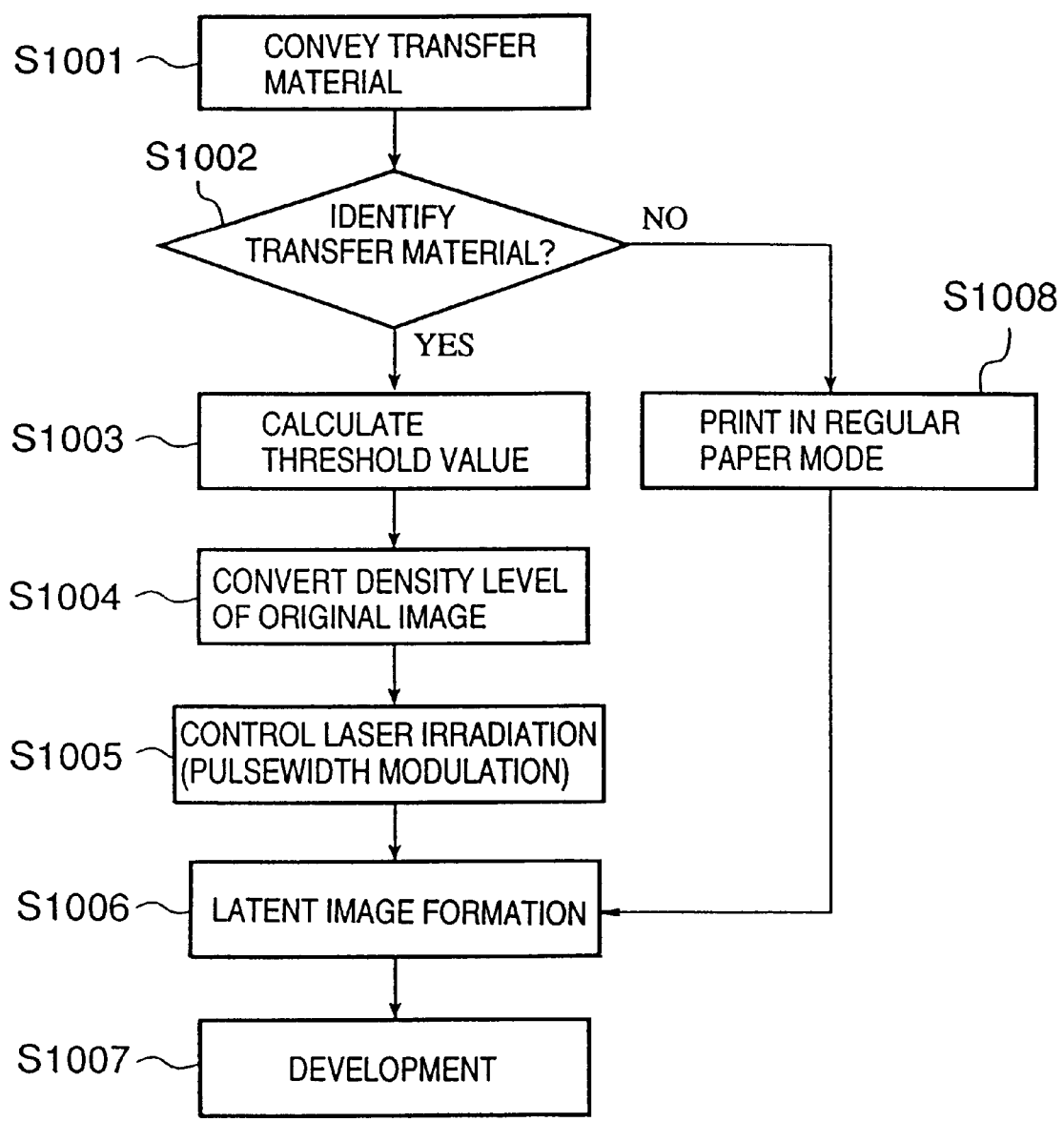
FIG. 10 is a flowchart showing a pulsewidth modulation process.

FIG. 10 is a flowchart showing the process according to the third embodiment. In the transfer material conveyance process (S1001), it is determined as to whether or not a supplied transfer material is a transparent film such as an OHP film. If it is not an OHP film (S1002-NO), printing is performed in a regular paper mode (S1008), while if it is an OHP film, a threshold value of the original image is calculated (S1002-YES and S1003), and the density level of the original image is converted in pixel units based on the calculated threshold value (S1004, FIG. 3B). Then, laser beam irradiation control (pulsewidth modulation) is performed (S1005) in accordance with the converted density level, and a latent image is formed (S1006), then the latent image is developed (S1007).

In the flowchart in FIG. 10, although laser beam irradiation is controlled by pulsewidth modulation in the OHP film mode, performed separately from the regular paper mode, the OHP film mode and the regular paper mode may be in the same mode.

The laser irradiation control may be executed cooperatively by the laser oscillator and rotation controller of the polygon scanner.

[Effect of Third Embodiment]

Since the density level of an original image is quantized based on the threshold value, dots and lines are no longer arrayed periodically, as shown in FIG. 3B. Therefore, the OHP film no longer acts as a diffraction grating, and the optical system of the projector and the film no longer interfere with each other on the projected image. Accordingly, the quality of a projected image significantly improves. Moreover, because the Fresnel lens of the projector no longer interferes, a clear projected image can be achieved. With regard to the prevention of stripes caused by interference of projected light, although the above embodiments have only mentioned about the Fresnel lens as optical parts of the projector, the present invention includes other optical parts which cause diffraction. The present invention is applicable not only to a light-transmitting transparent film but also to a half-transparent film.

[Other Embodiments]

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, in addition to the case in which the aforesaid functions according to the above embodiments are realized by executing program codes which are read by a computer, the present invention includes a case where an OS (operating system) or the like working on the computer performs a part or all of the processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

Figure 11:
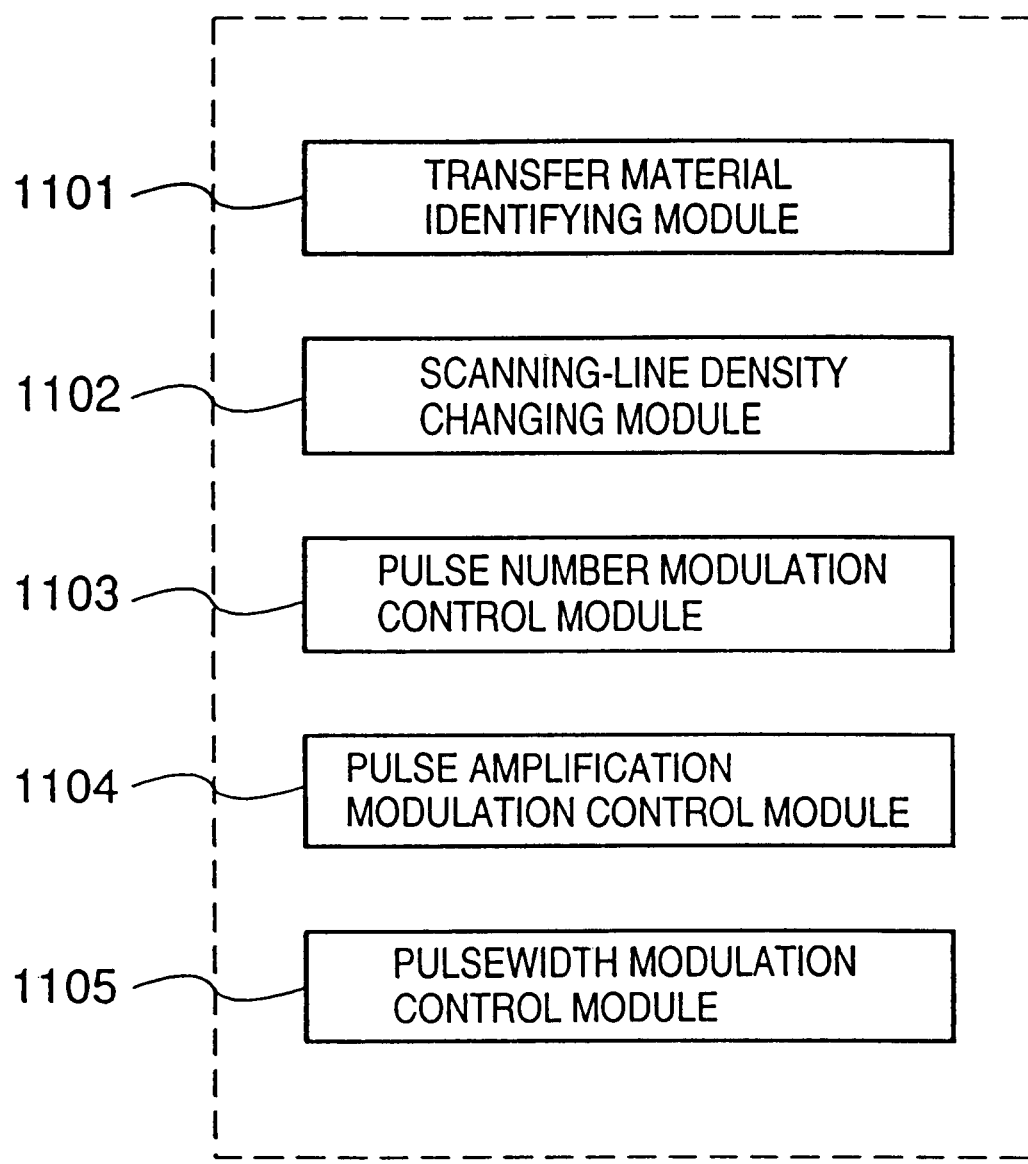
FIG. 11 is a memory map stored in a storage medium according to the present embodiment.

In a case where the present invention is applied to the aforesaid storage medium, the storage medium stores program codes corresponding to the flowcharts described in the embodiments. Briefly, the storage medium stores each module shown as an example of a memory map in FIG. 11. More specifically, program codes which correspond to the transfer material identifying module 1101, scan-line density changing module 1102, pulse number modulation control module 1103, pulse amplitude modulation control module 1104, and pulsewidth modulation control module 1105, at least, are to be stored in the storage medium.

As has been described above, the type of transfer material is first determined, and, based on the determination result, the output pulse number of a laser beam is modulated such that a latent image is formed at the scan-line density of 250 Lines/inch or more. As the precision of image formation is increased, spaces between lines of toner images on the OHP film are more largely affected by toner scattering. Thus, uniform line formation can be prevented. By virtue of this, the toner image on the transfer material no longer acts as a diffraction grating, and the optical interference no longer occurs between the optical system of the projector and the transfer material. Accordingly, the quality of a projected image significantly increases.

Furthermore, as has been described above, the type of transfer material is first determined, and, based on the determination result, the output pulse amplitude of a laser beam is modulated such that a latent image is formed in multivalued electrostatic charge levels. By developing this latent image, it is possible to change the density in accordance with the thickness of development toner. Accordingly, since isolated lines are not formed, optical interference does not occur between the optical system of the projector and the transfer material. As a result, the quality of a projected image significantly increases.

Still further, as has been described above, the type of transfer material is determined, and, based on the determination result, a threshold value for density data conversion is calculated. Density data of an original image is compared with the obtained threshold value, and a conversion image where density data of the original image has been converted in pixel units is formed. An output pulsewidth of a laser beam is modulated in accordance with the converted density data and a latent image is formed. By this, the density level is quantized based on the threshold value while maintaining the density level of the entire image. Therefore, dots and lines are not arrayed periodically, and an image formed on the transfer material no longer acts as a diffraction grating. Accordingly, optical interference no longer occurs between the optical system of the projector and the transfer material. As a result, the quality of a projected image significantly increases.

With regard to the prevention of stripes caused by interference of projected light, the present invention includes other optical parts of the projector which cause diffraction, besides the Fresnel lens. The present invention is applicable not only to a light-transmitting transparent film but also to a half-transparent film.

The present invention is not limited to the above embodiments and various changes and modifications can be made within the spirit and scope of the present invention. Therefore, to appraise the public of the scope of the present invention, the following claims are made.

What is claimed is:

1. An image forming apparatus constructed to form images on plural different kinds of print media including an OHP film medium for projection by an overhead projector, said image forming apparatus comprising:

a print engine for printing on a print medium, said print engine printing in lines with controllable spacing there between;

a signal generator for generating a signal representing that the print medium is an OHP film medium; and a controller for controlling scan-line density of said print engine to form an image on the print medium in non-uniform lines, based on the signal generated by said signal generator, wherein the non-uniform lines are spaced so as to reduce interference between the image formed on the print medium and an optical system of the projector, thereby to reduce visibility of light-and-dark stripes in an image projected from the projector.

2. An image forming apparatus according to claim 1, wherein the signal generated by said signal generator is generated in accordance with an identification result as to whether or not the print medium is an OHP film medium.

3. An image forming apparatus according to claim 1, wherein said controller controls the scan-line density to be at least 250 lines/inch.

4. An image forming apparatus according to claim 1, wherein said controller controls the scan-line density of said print engine for formation of bright and vivid portions of the image on the OHP film medium.

5. An image forming apparatus constructed to form images on plural different kinds of print media including an OHP film medium for projection by an overhead projector, said image forming apparatus comprising:
　a print engine for printing on a print medium, said print engine printing in lines formed with a controllable output pulse of a laser beam;
　a signal generator for generating a signal representing that the print medium is an OHP film medium; and
　a controller for controlling the output pulse of the laser beam of said print engine to form an image on the print medium in non-uniform lines, based on the signal generated by said signal generator,
　wherein the image is formed in non-uniform lines so as to reduce interference between the image formed on the print medium and an optical system of the projector, thereby to reduce visibility of light-and-dark stripes in an image projected from the projector.

6. An image forming apparatus according to claim 5, wherein the signal generated by said signal generator is generated in accordance with an identification result as to whether or not the print medium is an OHP film medium.

7. An image forming apparatus according to claim 5, wherein said controller controls a scan-line density of said print engine to be at least 250 lines/inch.

8. An image forming apparatus according to claim 5, wherein said controller controls a scan-line density of said print engine for formation of bright and vivid portions of the image on the OHP film medium.

9. An image forming apparatus constructed to form images on plural different kinds of print media including an OHP film medium for projection by an overhead projector, said image forming apparatus comprising:
　a print engine for printing on a print medium, said print engine printing in lines formed with a development toner having a controllable application thickness;
　a signal generator for generating a signal representing that the print medium is an OHP film medium; and
　a controller for controlling the application thickness of the development toner of said print engine to form an image on the print medium in non-uniform lines, based on the signal generated by said signal generator,
　wherein the image is formed in non-uniform lines so as to reduce interference between the image formed on the print medium and an optical system of the projector, thereby to reduce visibility of light-and-dark stripes in an image projected from the projector.

10. An image forming apparatus according to claim 9, wherein the signal generated by said signal generator is generated in accordance with an identification result as to whether or not the print medium is an OHP film medium.

11. An image forming apparatus according to claim 9, wherein said controller controls a scan-line density of said print engine for formation of bright and vivid portions of the image on the OHP film medium.

12. An image forming apparatus constructed to form images on plural different kinds of print media including an OHP film medium for projection by an overhead projector, said image forming apparatus comprising:
　a print engine for printing on a print medium, said print engine forming an image using a controllable quantization of a density level of an original image;
　a signal generator for generating a signal representing that the print medium is an OHP film medium; and
　a controller for controlling quantization of the density level of the original image for use by said print engine to form an image on the print medium with a random density distribution, based on the signal generated by said signal generator,
　wherein the image is formed with a random density distribution so as to reduce interference between the image formed on the print medium and an optical system of the projector, thereby to reduce visibility of light-and-dark stripes in an image projected from the projector.

13. An image forming apparatus according to claim 12, wherein the signal generated by said signal generator is generated in accordance with an identification result as to whether or not the print medium is an OHP film medium.

14. An image forming apparatus according to claim 12, wherein said controller controls a scan-line density of said print engine for formation of bright and vivid portions of the image on the OHP film medium.

15. An image forming method for forming images on plural different kinds of print media including an OHP film medium for projection by an overhead projector, said image forming method comprising the steps of:
　generating a signal representing that a print medium is an OHP film medium; and
　controlling scan-line density of a print engine, the print engine for printing on a print medium in lines with controllable spacing there between, to form an image on the print medium in non-uniform lines based on the signal generated in said generating step,
　wherein the non-uniform lines are spaced so as to reduce interference between the image formed on the print medium and an optical system of the projector, thereby to reduce visibility of light-and-dark stripes in an image projected from the projector.

16. An image forming method according to claim 15, wherein the signal generated in said generating step is generated in accordance with an identification result as to whether or not the print medium is an OHP film medium.

17. An image forming method according to claim 15, wherein in said controlling step the scan-line density is controlled to be at least 250 lines/inch.

18. An image forming method according to claim 15, wherein in said controlling step the scan-line density is controlled for formation of bright and vivid portions of the image on the OHP film medium.

19. An image forming method for forming images on plural different kinds of print media including an OHP film medium for projection by an overhead projector, said image forming method comprising the steps of:
　generating a signal representing that a print medium is an OHP film medium; and
　controlling an output pulse of a laser beam of a print engine, the print engine for printing on a print medium in lines formed with the controllable output pulse of the laser beam, to form an image on the print medium in non-uniform lines based on the signal generated in said generating step, wherein the image is formed in non-uniform lines so as to reduce interference between the image formed on the print medium and an optical system of the projector, thereby to reduce visibility of light-and-dark stripes in an image projected from the projector.

20. An image forming method according to claim 19, wherein the signal generated in said generating step is generated in accordance with an identification result as to whether or not the print medium is an OHP film medium.

21. An image forming method according to claim 19, wherein in said controlling step a scan-line density of the print engine is controlled to be at least 250 lines/inch.

22. An image forming method according to claim 19, wherein in said controlling step a scan-line density is controlled for formation of bright and vivid portions of the image on the OHP film medium.

23. An image forming method for forming images on plural different kinds of print media including an OHP film medium for projection by an overhead projector, said image forming method comprising the steps of:

generating a signal representing that a print medium is an OHP film medium; and controlling an application thickness of a development toner of a print engine, the print engine for printing on a print medium in lines formed with the development toner having a controllable application thickness, to form an image on the print medium in non-uniform lines based on the signal generated in said generating step, wherein the image is formed in non-uniform lines so as to reduce interference between the image formed on the print medium and an optical system of the projector, thereby to reduce visibility of light-and-dark stripes in an image projected from the projector.

24. An image forming method according to claim 23, wherein the signal generated in said generating step is generated in accordance with an identification result as to whether or not the print medium is an OHP film medium.

25. An image forming method according to claim 23, wherein in said controlling step a scan-line density of the print engine is controlled for formation of bright and vivid portions of the image on the OHP film medium.

26. An image forming method for forming images on plural different kinds of print media including an OHP film medium for projection by an overhead projector, said image forming method comprising the steps of:

generating a signal representing that a print medium is an OHP film medium; and controlling quantization of a density level of an original image for use by a print engine, the print engine for forming an image on a print medium using a controllable quantization of the density level of the original image, to form an image on the print medium with a random density distribution based on the signal generated in said generating step, wherein the image is formed with a random density distribution so as to reduce interference between the image formed on the print medium and an optical system of the projector, thereby to reduce visibility of light-and-dark stripes in an image projected from the projector.

27. An image forming method according to claim 26, wherein the signal generated in said generating step is generated in accordance with an identification result as to whether or not the print medium is an OHP film medium.

28. An image forming method according to claim 26, wherein in said controlling step a scan-line density of the print engine is controlled for formation of bright and vivid portions of the image on the OHP film medium.

* * * * *

UNITED STATES PATENT AND TRADEMARK OFFICE
CERTIFICATE OF CORRECTION

PATENT NO. : 6,437,817 B1
DATED : August 20, 2002
INVENTOR(S) : Mitsuhiro Ohta et al.

It is certified that error appears in the above-identified patent and that said Letters Patent is hereby corrected as shown below:

Column 1,
Line 58, "and an" should read -- and a --.

Column 2,
Line 9, "positions" should read -- position --.

Column 4,
Line 10, "become" should read -- becomes --.

Column 6,
Line 62, "follows" should read -- follow --.

Column 12,
Line 48, "appraise" should read -- apprise --; and
Line 56, "there" should read -- there- --.

Column 14,
Line 39, "there between," should read -- therebetween, --.

Signed and Sealed this

Eighteenth Day of February, 2003

JAMES E. ROGAN
*Director of the United States Patent and Trademark Office*